(12) United States Patent
Masuda

(10) Patent No.: US 12,205,275 B2
(45) Date of Patent: Jan. 21, 2025

(54) INFORMATION PROCESSING DEVICE, INFORMATION PROCESSING METHOD, AND STORAGE MEDIUM THAT PERFORM INFERENCING ON IMAGES IN AN ACQUIRED IMAGE GROUP BASED ON A SELECTED INFERENCE MODEL

(71) Applicants: CANON KABUSHIKI KAISHA, Tokyo (JP); CANON MEDICAL SYSTEMS CORPORATION, Tochigi (JP)

(72) Inventor: Yukiteru Masuda, Kanagawa (JP)

(73) Assignees: CANON KABUSHIKI KAISHA, Tokyo (JP); CANON MEDICAL SYSTEMS CORPORATION, Tochigi (JP)

( * ) Notice: Subject to any disclaimer, the term of this patent is extended or adjusted under 35 U.S.C. 154(b) by 429 days.

(21) Appl. No.: 17/325,720

(22) Filed: May 20, 2021

(65) Prior Publication Data

US 2021/0365722 A1    Nov. 25, 2021

(30) Foreign Application Priority Data

May 21, 2020    (JP) ................................. 2020-088902

(51) Int. Cl.
*G06F 18/20* (2023.01)
*G06N 5/04* (2023.01)
(Continued)

(52) U.S. Cl.
CPC .......... *G06T 7/0012* (2013.01); *G06F 18/285* (2023.01); *G06N 5/04* (2013.01);
(Continued)

(58) Field of Classification Search
None
See application file for complete search history.

(56) References Cited

U.S. PATENT DOCUMENTS 7,822,240 B2 * 10/2010 Ayache ..................... G06T 7/30
382/128
9,197,736 B2 * 11/2015 Davis ................ H04M 1/72448
(Continued)

FOREIGN PATENT DOCUMENTS

JP      2008541889 A    11/2008
JP      2016-067573 A   5/2016
(Continued)

OTHER PUBLICATIONS

Office Action issued on Oct. 26, 2023, in corresponding Japanese Patent Application No. 2020-088902, with English machine translation (6 pages).
(Continued)

*Primary Examiner* — Tsung Yin Tsai
(74) *Attorney, Agent, or Firm* — Venable LLP

(57) ABSTRACT

An information processing device includes at least one memory storing a program, and at least one processor that, by executing the program, causes the information processing apparatus to acquire an image group obtained by imaging a subject under a plurality of imaging conditions, to select at least one inference model from a plurality of inference models on the basis of at least one imaging condition among the plurality of imaging conditions, and to perform inferencing on images in the acquired image group by using the selected inference model.

13 Claims, 5 Drawing Sheets

(51) Int. Cl.
*G06T 7/00* (2017.01)
*G06N 20/00* (2019.01)

(52) U.S. Cl.
CPC .... *G06N 20/00* (2019.01); *G06T 2207/20081* (2013.01); *G06T 2207/30016* (2013.01); *G06T 2207/30096* (2013.01); *G06T 2207/30168* (2013.01); *G06V 2201/03* (2022.01)

(56) References Cited

U.S. PATENT DOCUMENTS

| | | | | |
|---|---|---|---|---|
| 9,760,837 | B1 * | 9/2017 | Nowozin | G06T 7/50 |
| 10,049,451 | B2 | 8/2018 | Fisher | |
| 10,769,497 | B2 * | 9/2020 | Haneda | G06N 3/08 |
| 2004/0008867 | A1 * | 1/2004 | Fein | G06T 3/40 |
| | | | | 359/326 |
| 2017/0262768 | A1 * | 9/2017 | Nowozin | G06F 18/214 |
| 2019/0197359 | A1 * | 6/2019 | Haneda | G06N 3/08 |
| 2019/0253615 | A1 * | 8/2019 | Fukuya | G10L 15/22 |
| 2020/0160965 | A1 * | 5/2020 | Lyman | H04L 67/12 |
| 2021/0027883 | A1 * | 1/2021 | Kumar | G16H 40/20 |
| 2023/0222771 | A1 * | 7/2023 | Beaumont | G06V 10/764 |
| | | | | 382/128 |

FOREIGN PATENT DOCUMENTS

| | | |
|---|---|---|
| JP | 2019111322 A | 7/2019 |
| WO | WO-2019073940 A1 * 4/2019 | ............... A61B 5/00 |

OTHER PUBLICATIONS

Office Action issued on Mar. 19, 2024, in corresponding Japanese Patent Application No. 2020-088902, with English machine translation (8 pages).

* cited by examiner

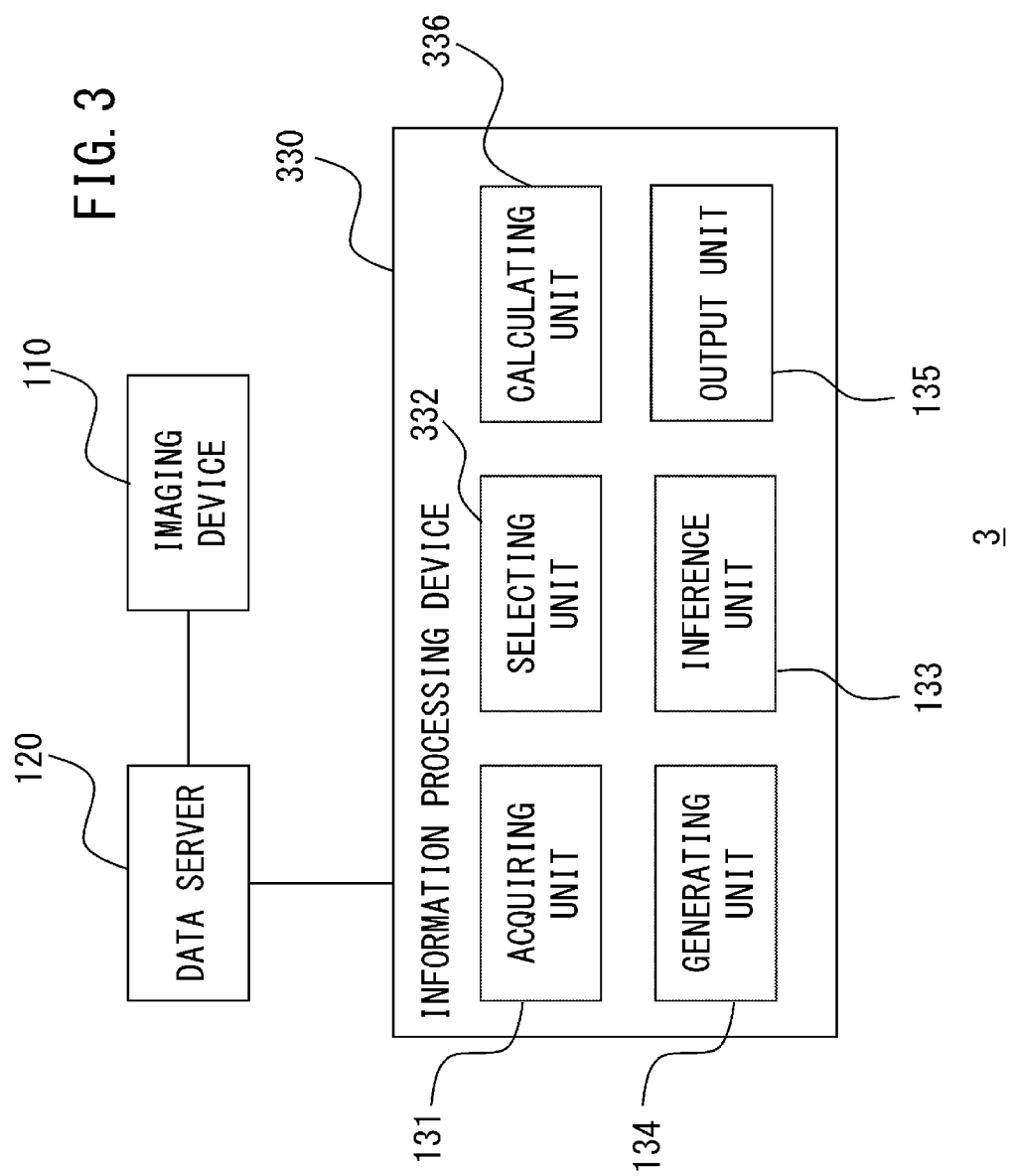

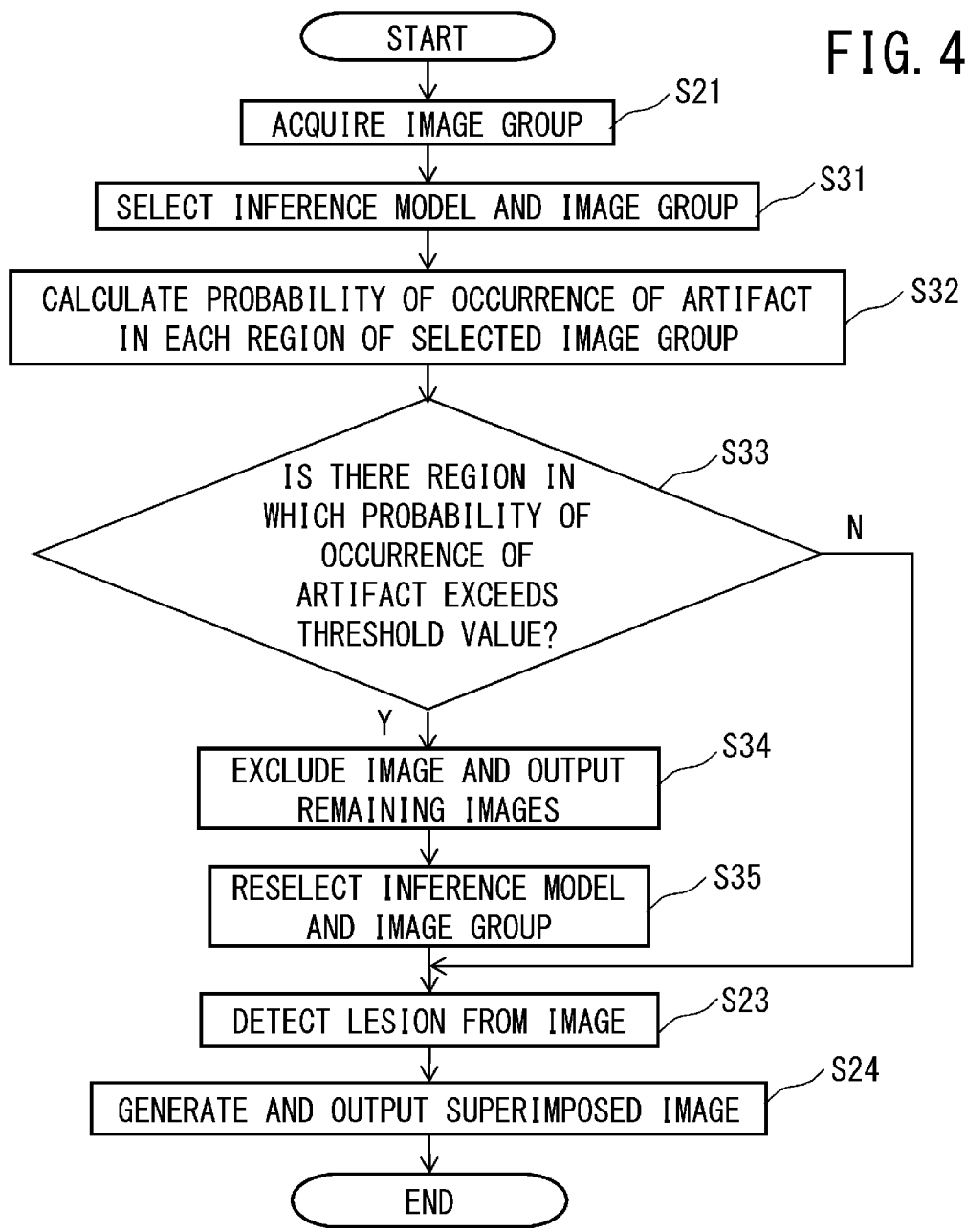

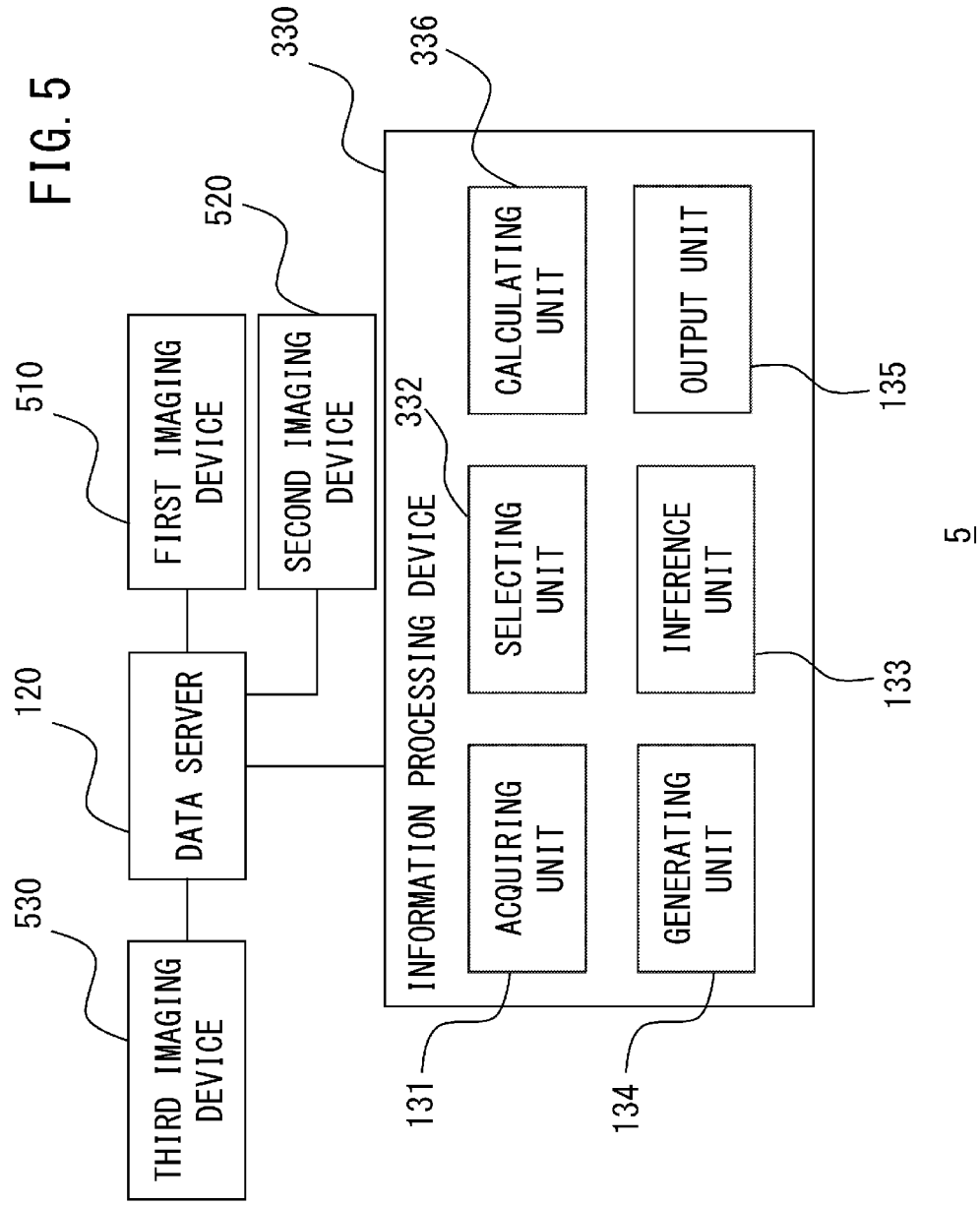

INFORMATION PROCESSING DEVICE, INFORMATION PROCESSING METHOD, AND STORAGE MEDIUM THAT PERFORM INFERENCING ON IMAGES IN AN ACQUIRED IMAGE GROUP BASED ON A SELECTED INFERENCE MODEL

BACKGROUND OF THE INVENTION

Cross-Reference to Priority Application

This application claims the benefit of Japanese Patent Application No. 2020-088902, filed on May 21, 2020, which is hereby incorporated by reference herein in its entirety.

FIELD OF THE INVENTION

The present disclosure relates to an information processing device, an information processing method, and a storage medium, for medical images.

DESCRIPTION OF THE RELATED ART

In medical image examinations, various imaging devices (modalities) such as magnetic resonance imaging (MRI) devices, X-ray computed tomography (CT) imaging devices, ultrasonography devices, and so forth, are commonly used. Various imaging conditions are employed for each modality, with T1-weighted imaging that accentuates a tissue structure of the body and T2-weighted imaging that accentuates lesions being used in MRI devices, for example. Also, different pieces of information are included in images acquired with the same modality but under different imaging conditions, and diagnosis is performed in clinical settings using a plurality of such images in combination.

In diagnosis using medical images, there also have been proposed various methods of performing inferencing (e.g., detection of lesions) with regard to images imaged under a plurality of imaging conditions by using an inference model created by machine learning.

For example, Japanese Patent Application Publication No. 2016-67573 discloses technology for selecting an inference model and images imaged under imaging conditions appropriate for lesion detection from an image group obtained by imaging the same subject under different imaging conditions. Also, the specification of U.S. Pat. No. 10,049,451 discloses a method of detecting a region of interest with regard to an image group obtained by imaging under different imaging conditions, by an inference model corresponding to the imaging conditions, and identifying a lesion by using a map indicating a probability of a lesion in the region of interest.

SUMMARY OF THE INVENTION

According to an aspect of the present disclosure, an information processing device includes at least one memory storing a program, and at least one processor that, by executing the program, causes the information processing apparatus to acquire an image group obtained by imaging a subject under a plurality of imaging conditions, to select at least one inference model from a plurality of inference models on the basis of at least one imaging condition among the plurality of imaging conditions, and to perform inferencing on images in the acquired image group by using the selected inference model.

In addition, according to an aspect of the present disclosure, an information processing method includes acquiring an image group obtained by imaging a subject under a plurality of imaging conditions, selecting at least one inference model from a plurality of inference models on the basis of at least one imaging condition of the plurality of imaging conditions, and performing inferencing on images in the acquired image group by using the selected inference model.

Further, according to an aspect of the present disclosure, a non-transitory computer readable medium that stores a program, the program causing a computer to execute an information processing method including acquiring an image group obtained by imaging a subject under a plurality of imaging conditions, selecting at least one inference model from a plurality of inference models on the basis of at least one imaging condition of the plurality of imaging conditions, and performing inferencing on images in the acquired image group by using the selected inference model.

Further features of the present invention will become apparent from the following description of exemplary embodiments with reference to the attached drawings.

BRIEF DESCRIPTION OF THE DRAWINGS

FIG. 3 is a diagram illustrating a schematic configuration example of an information processing device according to a second embodiment;

FIG. 4 is a flowchart illustrating a processing example executed in the second embodiment; and FIG. 5 is a diagram illustrating a schematic configuration example of an information processing device according to a modification.

DESCRIPTION OF THE EMBODIMENTS

The above-described related art is not capable of selecting appropriate imaging conditions or inference models unless the lesion to be detected is specified. Accordingly, a plurality of different inference models are used in accordance with imaging conditions for each image, and there is a problem in that inference is time-consuming. There also is a problem with the above-described technology in that results obtained using different inference models with regard to a plurality of images are combined, and accordingly an increase in imaging conditions makes the amount of time required for inference longer as well.

Accordingly, the technology according to the present disclosure provides technology for performing inferencing regarding lesions in images, obtained by imaging a subject under a plurality of imaging conditions, more speedily.

Embodiments of the present disclosure will be described below with reference to the Figures. Components, members, and processing, illustrated in the Figures, which are the same or equivalent, are denoted by the same symbols and a repetitive description will be omitted as appropriate. Also, part of the components, members, and processing are omitted from illustration in the Figures.

First Embodiment

An information processing system according to a first embodiment will be described below. In the present embodiment, an inference model is selected that is appropriate for an image group obtained by imaging a subject under a plurality of imaging conditions, and inferencing is performed related to the lesion in the images. In the description below, a case when a brain tumor is detected as a lesion, from an image group including T1-weighted images, T2-weighted images, and diffusion-weighted images obtained by imaging the head of a subject using an MRI device, will be assumed, as one example.

Figure 1:
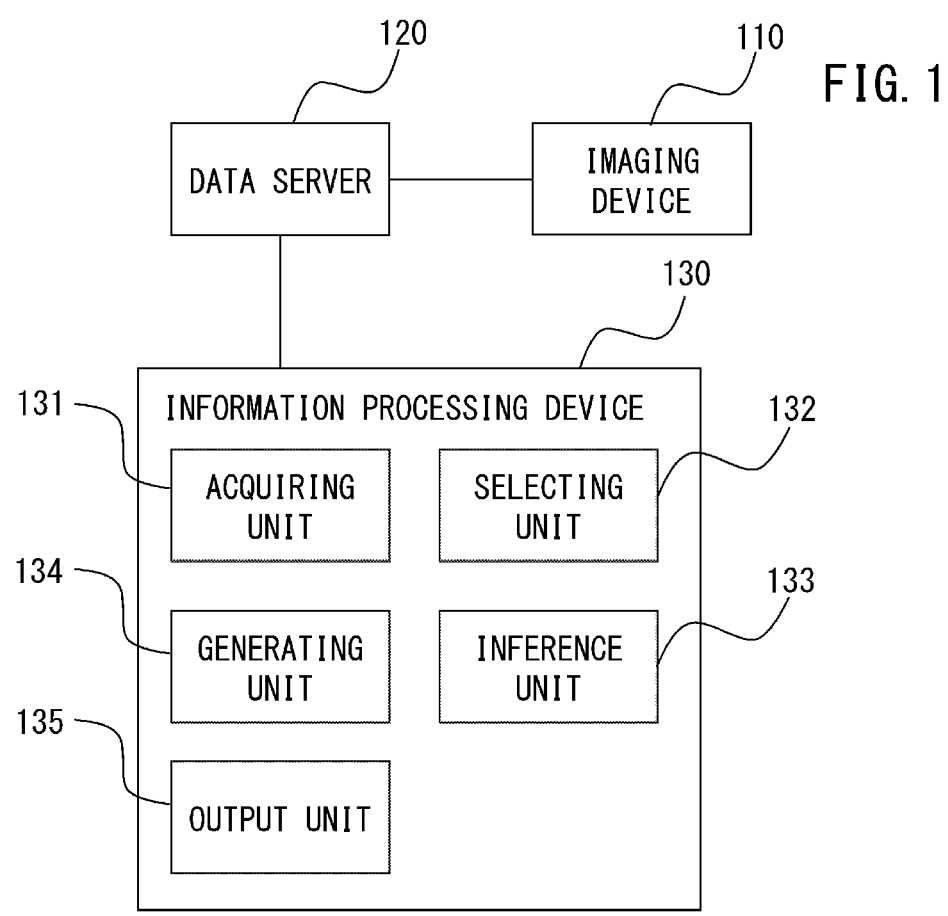
FIG. 1 is a diagram illustrating a schematic configuration example of an information processing device according to a first embodiment.

FIG. 1 is a block diagram illustrating an example of a configuration of an information processing system 1 according to the present embodiment. The information processing system 1 includes an imaging device 110, a data server 120, and an information processing device 130. The imaging device 110 is connected to the data server 120, and data imaged by the imaging device 110 is saved in the data server 120. The data server 120 is connected to the information processing device 130. The information processing device 130 has an acquiring unit 131, a selecting unit 132, an inference unit 133, a generating unit 134, and an output unit 135. The functions of the parts of the information processing device 130 are realized by a central processing unit (CPU) executing a program stored in a memory in the information processing device 130. The information processing device 130 acquires data of an image group imaged by the data server 120, and executes the processing described below using the acquired data.

In the present embodiment, the imaging device 110 is an MRI device that images the head of a subject under the imaging conditions of T1 weighting, T2 weighting, and diffusion weighting. The data server 120 saves an image group of T1-weighted images, T2-weighted images, and diffusion-weighted images received from the imaging device 110. The data server 120 also holds a plurality of trained inference models that have learned image groups including T1-weighted images, T2-weighted images, and diffusion-weighted images in advance by a deep neural network, or the like. Note that it is sufficient for at least one type of images of T1-weighted images, T2-weighted images, and diffusion-weighted images to be included in the image group, and images imaged under other imaging conditions may be included. Also, images to be used for learning are not limited to images imaged by the imaging device 110, and may be selected as appropriate. A system such as a picture archiving and communication system (PACS), or the like, that saves and manages images over a network, for example, may be used for the data server 120.

The acquiring unit 131 acquires an image group including a plurality of T1-weighted images, a plurality of T2-weighted images, and a plurality of diffusion-weighted images from the data server 120, in response to user instructions performed at the information processing device 130. Note that the types of images that the acquiring unit 131 acquires are not limited to these three types, and images of at least one type may be acquired. The acquiring unit 131 corresponds to acquiring means that acquires an image group obtained by imaging a subject under a plurality of imaging conditions. In the following description, the plurality of T1-weighted images may be referred to simply as "T1-weighted images". The same is true for the plurality of T2-weighted images and the plurality of diffusion-weighted images. "T1-weighted image" is the name of images imaged by executing a pulse sequence using first parameters, and "T2-weighted image" is the name of images imaged by executing a pulse sequence using second parameters. Typically, a longer repetition time (TR) is set for parameters for T1-weighted images as compared to parameters for T2-weighted images. In this way, imaging conditions are decided by parameters in the sequence. That is to say, imaging conditions can be made to differ depending on the difference in parameters among sequences.

The selecting unit 132 compares the image group acquired by the acquiring unit 131 (T1-weighted images, T2-weighted images, and diffusion-weighted images) with the input conditions of the inference models (types of images (imaging conditions) that are the object of input to the models) that the data server 120 holds. Input conditions of the inference models are each correlated with at least one imaging condition of the plurality of imaging conditions. For example, input conditions include conditions that at least one type of image of the T1-weighted images, T2-weighted images, and diffusion-weighted images is the object of input, such as conditions that only T1-weighted images are the object of input, conditions that T1 and T2-weighted images are the object of input, and so forth. This comparison identifies inference models regarding that satisfy the input conditions of at least one type of image out of the T1-weighted images, T2-weighted images, and diffusion-weighted images. The selecting unit 132 then selects, out of the inference models that satisfy the input conditions of the acquired image group, the inference model that is the highest in order of priority, which has been defined in advance. The standard for the order of priority of the inference model selected here is, for example, the height of inference precision in detecting lesions from images, and the higher the inference precision is, the higher the order of priority is. The selecting unit 132 may select not only the inference model that is the highest in order of priority, but also select inference models that are a predetermined number of places in height from the top of order of priority. Thus, the selecting unit 132 selects a plurality of models corresponding to a plurality of imaging conditions. Also, the standard for the order of priority may be employed as appropriate, such as the number of images for each imaging condition included in other image groups, regardless of the height of inference precision. The selecting unit 132 corresponds to selecting means that selects at least one inference model from a plurality of inference models, on the basis of at least one imaging condition out of the plurality of imaging conditions. Also, the standard for the order in priority corresponds to a predetermined standard for selecting the inference model with the highest order in priority.

The selecting unit 132 then selects, out of the image group acquired by the acquiring unit 131, images that match the input conditions of the selected inference model, as a new image group. The selecting unit 132 outputs the selected inference model and the image group to the inference unit 133.

For example, an assumption will be made that the data server 120 holds an inference model A, an inference model B, and an inference model C, which perform some sort of inference with regard to input images. The input conditions of the inference models A, B, and C here respectively are "T1-weighted images and T2-weighted images are object of input", "T1-weighted images, T2-weighted images, and fluid-attenuated inversion recovery (FLAIR) images are object of input", and "T1-weighted images are object of input". Also, the order of priority of the inference models A, B, and C is inference model B, inference model A, and inference model C, in descending order. Further, an image group including T1-weighted images, T2-weighted images, and diffusion-weighted images is acquired by the acquiring unit 131.

In this case, the selecting unit 132 selects the inference model A and the inference model C as inference models of which the acquired image group satisfies the input conditions. No FLAIR images are included in the image group, and accordingly the selecting unit 132 excludes the inference model B from the object of selection. The selecting unit 132 then selects the inference model A that has the highest order of priority. Further, the selecting unit 132 selects, from the image group acquired by the acquiring unit 131, T1-weighted images and T2-weighted images that are objects of input matching the input conditions of the inference model A, as a new image group.

Now, the diffusion-weighted images included in the image group acquired by the acquiring unit 131 are ineligible for input of the inference model A, and accordingly the selecting unit 132 excludes diffusion-weighted images from the image group.

The inference unit 133 applies the selected inference model to the new image group made up of images matching the input conditions of the inference model selected by the selecting unit 132, and performs detection of a brain tumor that is the lesion in the images. In a case when a plurality of inference models are selected by the selecting unit 132, the inference unit 133 performs inferencing regarding the lesion for each of the images in the image group, using the plurality of inference models. The inference unit 133 corresponds to inference means that perform inferencing as to images of the image group.

The generating unit 134 generates superimposed images, in which indices indicating a region of the brain tumor detected by the inference unit 133 are superimposed on images in the image group selected by the selecting unit 132. The generating unit 134 corresponds to generating means that generates images indicating the position of the lesion detected by inference in the images of the acquired image group.

The output unit 135 outputs superimposed images, in which indices of the brain tumor generated by the generating unit 134 are superimposed, to the data server 120, a display unit of an information processing device omitted from illustration, an external display device, or the like.

Figure 2:
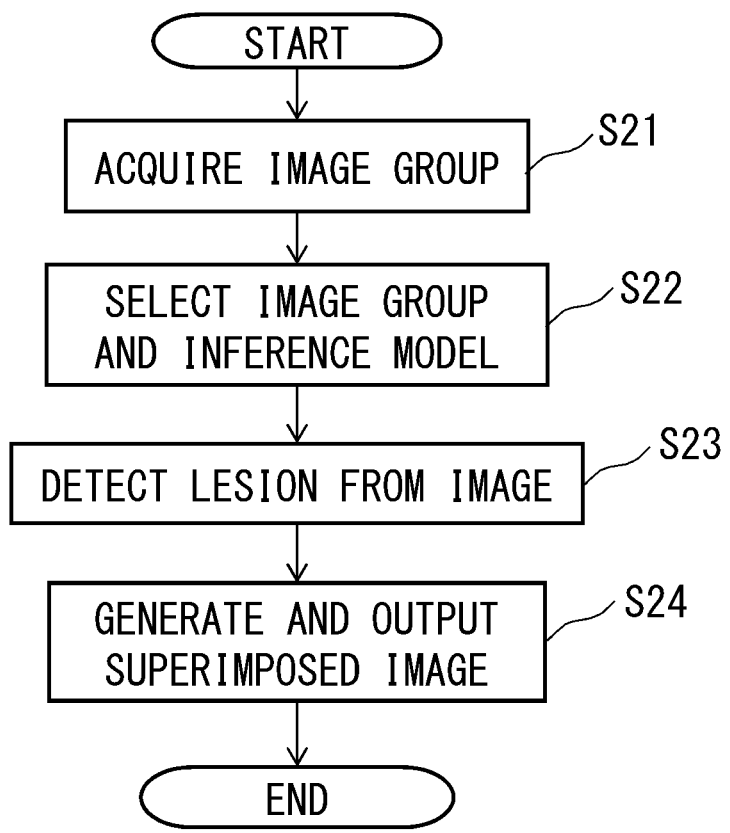
FIG. 2 is a flowchart illustrating a processing example executed in the first embodiment.

Next, the processing that the information processing device 130 executes in the present embodiment will be described with reference to the flowchart in FIG. 2. The CPU of the information processing device 130 starts the processing of the flowchart in FIG. 2 upon receiving an instruction from a user of the information processing device 130, for example.

In step S21, the CPU of the information processing device 130 accepts a specification of imaging conditions for images from the user. The acquiring unit 131 then performs communication with the data server 120 and acquires an image group imaged under imaging conditions matching the imaging conditions that the user has specified, from the data server 120. The acquiring unit 131 outputs the acquired image group to the selecting unit 132.

In step S22, the selecting unit 132 first selects an inference model that satisfies the input conditions of the image group input from the acquiring unit 131. Next, the selecting unit 132 selects the inference model of which the order of priority is the highest, in accordance with the order of priorities of the inference models stored in a memory of the information processing device 130. The selecting unit 132 selects, from the image group input from the acquiring unit 131, images matching the input conditions defined in the selected inference model as a new image group, and outputs the selected image group to the inference unit 133.

Now, at the time of selecting the inference model satisfying the input conditions of the image group input from the acquiring unit 131, the selecting unit 132 may identify the inference model to be selected by referencing header information, or the like, included in images of the input image group. Alternatively, the selecting unit 132 may use machine learning, or the like, to distinguish under what imaging conditions the input image group was imaged, and to identify the inference model to be selected on the basis of the results of distinguishing. In these cases, in step S21, the acquiring unit 131 acquires the image group from the data server 120 without performing processing of accepting a specification regarding imaging conditions from the user.

In step S23, the inference unit 133 detects the brain tumor in the images by inputting the image groups selected in step S22 into the inference model selected in S22. In the present embodiment, the brain tumor in the images is detected by the inference unit 133 using a known segmentation technique on the images, such as a U-Net, or the like, as an example.

In step S24, the generating unit 134 generates superimposed images, in which indices indicating a region of the brain tumor detected by the inference unit 133 are superimposed on the images in the image group selected in step S22. The output unit 135 then outputs the superimposed images generated by the generating unit 134 to the data server 120.

Thus, according to the information processing device of the present embodiment, an appropriate image group for input to an inference model can be selected from an image group imaged by an MRI device or the like, and inferencing of a legion within the images of the selected image group can be performed. Accordingly, inferencing regarding lesions can be speedily performed on an image group obtained by imaging the same subject under a plurality of imaging conditions.

Second Embodiment

Next, an information processing system according to a second embodiment will be described. Note that, in the following description, configurations that are the same as those in the first embodiment are denoted by the same symbols, and a detailed description will be omitted.

Phenomena that deteriorate the quality of inference, such as artifacts, for example, may occur in images imaged by an imaging device. As such, in the present embodiment, the information processing device selects, from an image group obtained by imaging the same subject under a plurality of imaging conditions, an image group of a quality appropriate for inference of a lesion. The information processing device then selects an inference model appropriate for the selected image group, and performs inferencing regarding the lesion in the images. Although artifacts are assumed in the following description as phenomena that deteriorate the quality of inference, the following processing may be applied to other phenomena that occur in images and that affect quality of inference, such as image distortion, contrast, and so forth.

An example of choosing an image group with appropriate quality on the basis of estimation values of artifacts occurring at the time of imaging images will be described in the present embodiment. Although a case of a motion artifact occurring at the time of imaging is assumed in the following description, the types of artifacts occurring in images are not limited to this. The present embodiment can also be applied in cases when artifacts occurring in images are ring artifacts, streak artifacts, shower artifacts, shading artifacts, beam hardening, and so forth, for example.

FIG. 3 is a block diagram illustrating an example of a configuration of an information processing system 3 according to the present embodiment. A description will be made here primarily regarding configurations that are different from the configurations of the first embodiment. An information processing device 330 includes the acquiring unit 131, the inference unit 133, the generating unit 134, the output unit 135, a selecting unit 332, and a calculating unit 336.

The selecting unit 332 compares the image group acquired by the acquiring unit 131 with input conditions of the inference models that the data server 120 holds, and selects an inference model for the image group acquired in accordance with an order of priority. The selecting unit 332 then selects, from the image group acquired by the acquiring unit 131, images matching the input conditions of the selected inference model as a new image group. The selecting unit 332 outputs the selected image group to the calculating unit 336.

The calculating unit 336 divides the images of the image group selected by the selecting unit 332 into a plurality of regions, and calculates, for each divided region, the probability of a motion artifact occurring, using a known technique that is based on image processing, for each imaging condition. The calculating unit 336 corresponds to calculating means that calculates the probability of occurrence of a phenomenon that would deteriorate inference in each region of the images.

The probability of a motion artifact occurring may be calculated by applying an inference model trained in advance, using machine learning, or the like, to the images. The calculating unit 336 outputs information indicating the probability of a motion artifact occurring for each divided region of the image group to the selecting unit 332.

The selecting unit 332 compares the probability of occurrence that is input from the calculating unit 336 with a predetermined threshold value of probability of occurrence of a motion artifact defined in advance. The selecting unit 332 then identifies images having a region in which the probability of occurrence of an artifact exceeds the threshold value. Further, the selecting unit 332 excludes, from the image group output to the calculating unit 336, images imaged under the same imaging conditions as the images identified here, and reselects an inference model with regard to the image group made up of the remaining images, by executing the above processing. The selecting unit 332 then outputs the image group made up of the images after exclusion and the reselected inference model to the inference unit 133.

Next, the processing executed by the information processing device 330 according to the present embodiment will be described with reference to the flowchart in FIG. 4. The CPU of the information processing device 330 starts the processing of the flowchart in FIG. 4 upon receiving an instruction from a user of the information processing device 330, for example.

Step S21 is the same as the processing in the first embodiment. The acquiring unit 131 outputs the image group acquired from the data server 120 to the selecting unit 332.

Next, in step S31, the selecting unit 332 selects an inference model that satisfies the input conditions of the image group input from the acquiring unit 131. The selecting unit 332 then selects the inference model of which the order of priority is the highest, in accordance with the order of priorities of the inference models stored in memory of the information processing device 330. The selecting unit 332 further selects, from the image group input from the acquiring unit 131, images matching the input conditions defined in the selected inference model as a new image group. In step S31, the selecting unit 332 outputs the selected image group to the calculating unit 336.

In step S32, the calculating unit 336 divides each image of the image group selected in step S31 by the selecting unit 332 into a plurality of regions, using a known technique. The calculating unit 336 then calculates the probability of occurrence of a motion artifact, using a known technique, for each divided region in each image.

In step S33, the selecting unit 332 determines whether or not the probability of occurrence of a motion artifact calculated in step S32 exceeds the threshold value defined in advance. In a case when there is a region in which the probability of occurrence of a motion artifact exceeds the threshold value (Y in S33), the flow advances to step S34. Conversely, in a case when there is no region in which the probability of occurrence of a motion artifact exceeds the threshold value (N in S33), the flow advances to step S23.

In step S34, the selecting unit 332 excludes, from the image group selected in step S31, images imaged under the same imaging conditions as images having a region in which the probability of occurrence of a motion artifact exceeds the threshold value. The flow then advances to step S35.

In step S35, the selecting unit 332 executes processing that is the same as in step S31, and subjects the image group made up of the remaining images in step S34 to processing, reselects the image group and inference model, and outputs the selected image group and inference model to the inference unit 133.

Next, the processing in steps S23 and S24 is the same as the processing in the first embodiment. In a case when the flow has advanced from step S33 to step S34 (case of Y in S33), in step S23, the inference unit 133 inputs the image group reselected in step S35 to the inference model reselected in step S35, and detects the brain tumor in each of the images of the image group. Also, in a case when the flow has advanced from step S33 to step S23 without passing through steps S34 and S35 (case of N in S33), in step S23, the inference unit 133 uses the inference model and the image group selected in step S31 to detect the brain tumor in each of the images of the image group. Then, in step S24, the generating unit 134 generates superimposed images, in which indices indicating a region of the brain tumor detected by the inference unit 133 are superimposed on the images in the image group reselected in step S35. The output unit 135 then outputs the superimposed images generated by the generating unit 134 to the data server 120.

Thus, according to the information processing device of the present embodiment, even if images of poor quality in which artifacts have occurred are included in the imaged image group, inferencing can be performed with such images excluded. Accordingly, the precision of inference regarding a lesion in images obtained by imaging the same subject under a plurality of imaging conditions can be improved.

Other Embodiments

The above-described embodiments are but specific examples of the present disclosure. The scope of the present disclosure is not limited to the configurations of the above-described embodiments, and various embodiments can be made within a scope not departing from the essence thereof.

Modifications of the above embodiments will be described below. The following modifications may be combined with each other and carried out, or may be combined as appropriate with the above embodiments and carried out. Note that, in the following description, configurations that are the same as those in the above embodiments are denoted by the same symbols, and a detailed description will be omitted.

First Modification

A case of detecting a brain tumor from T1-weighted images and T2-weighted images obtained by imaging the head of a subject using an MRI device has been described as an example in the above embodiments. Note that, as one modification, the imaging conditions when imaging the subject with an MRI device is not limited to T1 weighting, T2 weighting, or diffusion weighting. The imaging conditions may be proton-density weighted imaging, FLAIR, susceptibility-weighted imaging, magnetic resonance angiography (MRA), T2*-weighted imaging, or the like, and may be any combination of these imaging conditions.

Also, the imaging device 110 that images the subject is not limited an MRI device, and may be an X-ray CT device, ultrasonography device, or the like. Examples of imaging conditions for an X-ray CT device include lung window, mediastinal window, and so forth. Also, examples of imaging conditions for an ultrasonography device may be B-mode, doppler, elastography, and so forth. Further, a plurality of imaging devices may be used in tandem in the above information processing system. In this case, an image group obtained by imaging the same site of the same subject by the plurality of imaging devices is preferably used. Also, a singular imaging device that images a subject through a combination of a plurality of imaging devices, such as positron emission tomography (PET)-CT, may be used. Accordingly, in the above information processing system, the acquiring unit 131 can acquire an image group obtained by imaging by different modalities, acquire an image group obtained by imaging under a plurality of imaging conductions by the same modality, and so forth. In a case of imaging the subject by different modalities, image groups of various image types are obtained by imaging by these modalities. The term "image type" as used here indicates the type of modality that images the subject and generates an imaged image.

FIG. 5 illustrates a schematic configuration of an information processing system 5 that is an example of the present modification. Note that configurations that are the same as those in the above embodiments are denoted by the same symbols, and a detailed description will be omitted. In the information processing system 5, the data server 120 stores imaged images generated by a first imaging device 510, a second imaging device 520, and a third imaging device 530, which are each different modalities. For example, an arrangement may be made where the first imaging device 510 is an MRI device, the second imaging device 520 is a CT device, and the third imaging device 530 is an ultrasonography device. The information processing device 330 then executes the above processing as to an image group made up of a plurality of image types acquired by the data server 120, thereby performing inferencing regarding lesions as to images in the image group.

In the present modification, the acquiring unit 131 acquires an image group made up of a plurality of image types obtained by imaging a subject by different modalities. Also, the selecting unit 332 uses image types as the input conditions of the inference models instead of the imaging conditions in the above embodiments, and selects at least one inference model from a plurality of inference models on the basis of at least one image type out of a plurality of image types. Note that, the selecting unit 332 may select an inference model corresponding to image types and imaging conditions. The inference unit 133 uses the selected inference model to perform inferencing regarding lesions as to the images of the image group that has been acquired.

The types of modalities used for imaging the subject differ depending on the usage environment of the information processing system. According to the present modification, even in a case when only images of a particular plurality of image types, such as MR images and CT images alone, for example, can be obtained, optimal inference results regarding lesions corresponding to image types can be obtained by the information processing device 330.

Also, the information processing device 330 may perform inferencing regarding lesions as to an images of image group including imaged images obtained using a plurality of imaging conditions, and imaged images obtained by a plurality of image types. For example, a case is assumed where an image group includes T1-weighted images and T2-weighted images generated by an MRI device, and CT images generated by a CT device that is a separate modality. Thus, the information processing device 330 can obtain inference regarding lesions in the same way as above, with regard to an image group made up of a combination of a plurality of images obtained by difference sequences of a singular modality, and images obtained by another modality, as well.

Also, the imaging site of the subject is not limited to the head, and may be the chest or abdomen, or the like. The lesion that is the object of inference is not limited to brain tumors, and may be a stroke, a lung nodule, or the like, depending on the imaging site. Also, inferencing relating to lesions is not limited to detection of lesions, and may include malignancy differentiation, prognosis prediction, determination of whether or not a lesion is present in an image, and so forth. An inference model is created in accordance with the lesion that is the object of inference or the object of detection. Also, in the above description, image types and image conditions can be deemed to be the same input conditions, as input conditions for the inference model. That is to say, the types of modalities used for imaging may be included in the imaging conditions.

Second Modification

A description has been made in the above embodiments regarding a case when images acquired under the same imaging conditions as an image having a region regarding which the probability of occurrence of an artifact exceeds a threshold value are excluded from the image group acquired from the data server 120. However, as one modification, an arrangement may be made in which the selecting unit 332 excludes only images having a region regarding which the probability of occurrence of an artifact exceeds the threshold value, i.e., only images including artifacts, from the acquired image group.

In this case, in step S34, the selecting unit 332 excludes only images having a region regarding which the probability of occurrence of an artifact exceeds the threshold value from the image group selected in step S31. In step S35, the selecting unit 332 reselects the inference model and the image group as to the image group made up of sets of remaining images, in the same way as described above. The inference unit 133 then inputs the image group reselected in step S35 to the inference model reselected in step S35, and detects the brain tumor in the images of the image group.

Accordingly, images in which no artifacts have occurred can be input to the inference model without being excluded, and, accordingly, it is anticipated that inference results with even higher precision can be obtained.

Note that, in the present modification, when images having regions in which the probability of occurrence of an artifact exceeds the threshold value are excluded, and the number of images remaining that have been imaged under the same imaging conditions as the excluded image is low, there is a possibility that using the images imaged under these imaging conditions may also lower the inference precision. Accordingly, an arrangement may be made in which, in a case when the percentage of images having occurrence of artifacts in the images imaged under the same imaging conditions exceeds a predetermined percentage, the selecting unit 332 may exclude all images imaged under the same imaging conditions in the same way as in the above embodiments. An example of the percentage of images having occurrence of artifacts here is the proportion of the number of images having occurrence of artifacts as to the images imaged under the same imaging conditions. The number of images having an occurrence of artifacts in the images imaged under the same imaging conditions exceeding a predetermined number may be deemed as being the percentage of images having occurrence of artifacts as to the images imaged under the same imaging conditions exceeding the predetermined percentage.

Third Modification

Processing of excluding images having a region in which the probability of occurrence of an artifact exceeds the threshold value from the object of input to the inference model, regardless of position in the image, has been described in the above embodiments. However, as one modification, the selecting unit 332 may determine in step S34 whether or not the region in which the probability of occurrence of an artifact exceeds the threshold value is included in a region of interest, defined in advance. Alternatively, the selecting unit 332 may determine whether or not there is a region in which the probability of occurrence of an artifact exceeds the threshold value for only this region of interest. The region of interest may be defined as appropriate, such as being specified by a user, being automatically extracted from an image acquired from the data server 120, and so forth. In a case when a region in which the probability of occurrence of an artifact exceeds the threshold value is included in the region of interest, the selecting unit 332 excludes the image having the region regarding which the probability of occurrence of an artifact exceeds the threshold value from the object of input to the inference model. Accordingly, even if there is an artifact that has occurred in a certain image, this image can be input to the inference model without being excluded as long as the artifact has not occurred in the region of interest, and, accordingly, it is anticipated that inference results with even higher precision can be obtained.

Fourth Modification

A case of excluding images having a region in which the probability of occurrence of an artifact exceeds the threshold value from the object of input to the inference model has been described in the above embodiments. However, as one modification, an arrangement may be made where such images are not excluded from the object of input to the inference model, and a selection of the inference model and inferencing are performed using an image group including these images. The generating unit 134 may then generate information indicating that images with low quality are used in the inference, along with the inference results from the inference unit 133. Alternatively, the generating unit 134 may perform correction regarding artifacts as to images having a region regarding which the probability of occurrence of an artifact exceeds the threshold value by machine learning, or the like, as correcting means, with the inference unit 133 performing inferencing as to the image group including the corrected images.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

According to the technology of the present disclosure, inferencing regarding lesions in images, obtained by imaging a subject under a plurality of imaging conditions, can be performed more speedily.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
at least one memory storing a program; and
at least one processor that, by executing the program, causes the information processing apparatus:
to acquire an image group obtained by imaging a subject under a plurality of imaging conditions;
to select at least one inference model from a plurality of inference models on the basis of at least one imaging condition among the plurality of imaging conditions;
to perform inferencing on images in the acquired image group by using the selected inference model;
to calculate, for each image in the acquired image group, a probability of occurrence of a phenomenon that lowers inference in each region in the image; and
to select the inference model, with an image that has a region, in which the calculated probability of occurrence of the phenomenon exceeds a predetermined threshold value, being excluded from the acquired image group.

2. The information processing apparatus according to claim 1, wherein the plurality of imaging conditions include at least T1 weighting, T2 weighting, and diffusion weighting.

3. The information processing apparatus according to claim 1, wherein the at least one processor, by executing the program, further causes the information processing apparatus to acquire an image group obtained by imaging by the same modality under a plurality of imaging conditions.

4. The information processing apparatus according to claim 1, wherein the at least one processor, by executing the program, further causes the information processing apparatus to select the inference model, with an image that has been acquired under the same imaging conditions as the image that has a region, in which the calculated probability of occurrence of the phenomenon exceeds a predetermined threshold value, being excluded from the acquired image group.

5. The information processing apparatus according to claim 1, wherein an image including a region related to an artifact is excluded from the acquired image group.

6. The information processing apparatus according to claim 1, wherein the at least one processor, by executing the program, further causes the information processing apparatus to generate information that indicates that an image including a region related to an artifact is used in the inferencing, along with an inference result from the inferencing.

7. The information processing apparatus according to claim 1, wherein the at least one processor, by executing the program, further causes the information processing apparatus to perform correction regarding an artifact as to an image in the acquired image group and to perform the inferencing on the images in the acquired image group that includes the corrected image.

8. The information processing apparatus according to claim 1, wherein the plurality of imaging conditions include image types, and
the at least one processor, by executing the program, causes the information processing apparatus to select the at least one inference model from the plurality of inference models on a combination of the image types included in the plurality of imaging conditions.

9. An information processing apparatus comprising:
at least one memory storing a program; and
at least one processor that, by executing the program, causes the information processing apparatus:
to acquire an image group obtained by imaging a subject under a plurality of imaging conditions;
to select at least one inference model from a plurality of inference models on the basis of at least one imaging condition among the plurality of imaging conditions;
to perform inferencing on images in the acquired image group by using the selected inference model;
to calculate, for each image in the acquired image group, a probability of occurrence of a phenomenon that lowers inference in each region in the image; and
to select the inference model, with an image that has a region, in which the calculated probability of occurrence of the phenomenon exceeds a predetermined threshold value included in a region of interest, being excluded from the acquired image group.

10. An information processing apparatus comprising:
at least one memory storing a program; and
at least one processor that, by executing the program, causes the information processing apparatus:
to acquire an image group obtained by imaging a subject under a plurality of imaging conditions;
to select at least one inference model from a plurality of inference models on the basis of at least one imaging condition among the plurality of imaging conditions;
to perform inferencing on images in the acquired image group by using the selected inference model;
to calculate, for each image in the acquired image group, a probability of occurrence of a phenomenon that lowers inference in each region in the image; and
to generate information indicating that an image with low quality is used for the inference, in a case when the inferencing is performed using an image having a region, in which the calculated probability of occurrence of the phenomenon exceeds a predetermined threshold value.

11. An information processing apparatus comprising:
at least one memory storing a program; and
at least one processor that, by executing the program, causes the information processing apparatus:
to acquire an image group obtained by imaging a subject under a plurality of imaging conditions;
to select at least one inference model from a plurality of inference models on the basis of at least one imaging condition among the plurality of imaging conditions;
to perform inferencing on images in the acquired image group by using the selected inference model;
to calculate, for each image in the acquired image group, a probability of occurrence of a phenomenon that lowers inference in each region in the image;
to perform correction, which relates to the phenomenon, on an image having a region, in which the calculated probability of occurrence of the phenomenon exceeds the predetermined threshold value; and
to perform the inferencing on the image group including the image subjected to the correction.

12. An information processing method comprising:
acquiring an image group obtained by imaging a subject under a plurality of imaging conditions;
selecting at least one inference model from a plurality of inference models on the basis of at least one imaging condition among the plurality of imaging conditions;
performing inferencing on images in the acquired image group by using the selected inference model;
calculating, for each image in the acquired image group, a probability of occurrence of a phenomenon that lowers inference in each region in the image; and
selecting the inference model, with an image that has a region, in which the calculated probability of occurrence of the phenomenon exceeds a predetermined threshold value, being excluded from the acquired image group.

13. A non-transitory computer readable medium that stores a program that causes a computer to execute an information processing method comprising:
acquiring an image group obtained by imaging a subject under a plurality of imaging conditions;
selecting at least one inference model from a plurality of inference models on the basis of at least one imaging condition among the plurality of imaging conditions;

performing inferencing on images in the acquired image group by using the selected inference model;
calculating, for each image in the acquired image group, a probability of occurrence of a phenomenon that lowers inference in each region in the image; and
selecting the inference model, with an image that has a region, in which the calculated probability of occurrence of the phenomenon exceeds a predetermined threshold value, being excluded from the acquired image group.

* * * * *